May 23, 1967 R. L. DUNKELMAN 3,320,945
STEAM CABINET FOR FOOD PRODUCTS
Filed Nov. 12, 1964 3 Sheets-Sheet 1

INVENTOR.
ROBERT L. DUNKELMAN
BY
Kimmel & Crowell
ATTORNEYS.

INVENTOR.
ROBERT L. DUNKELMAN
BY Kimmel & Crowell
ATTORNEYS.

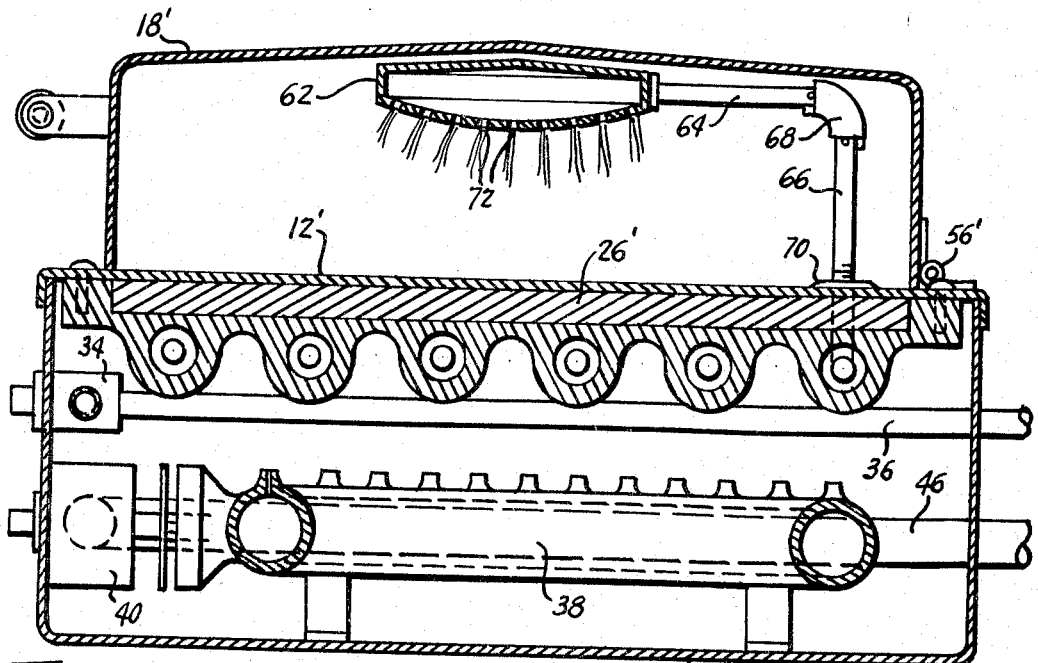
FIG. 5
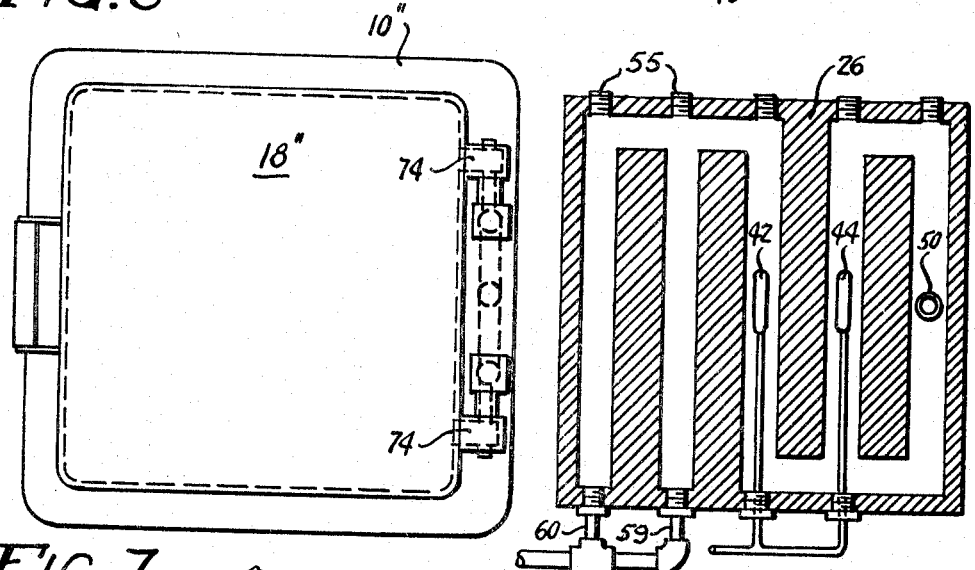
FIG. 7
FIG. 6
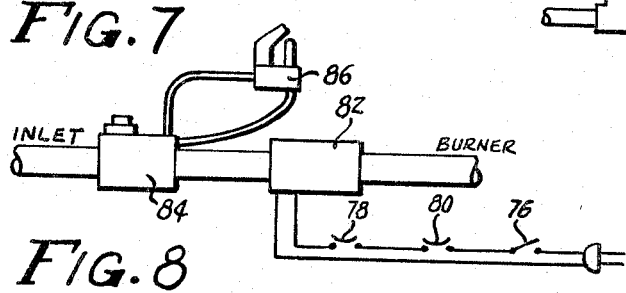
FIG. 8
INVENTOR.
ROBERT L. DUNKELMAN
BY Kimmel & Crowell
ATTORNEYS.

United States Patent Office 3,320,945
Patented May 23, 1967

3,320,945
STEAM CABINET FOR FOOD PRODUCTS
Robert L. Dunkelman, P.O. Box 7065,
Shreveport, La. 71107
Filed Nov. 12, 1964, Ser. No. 410,621
6 Claims. (Cl. 126—369)

The present invention relates to a cabinet for heating food product articles, and in particular to a cabinet into which pre-cooked food product articles may be introduced for storage at moderate heats until needed at which time steam under high heat is introduced into the cabinet for heating the food articles to a serving temperature.

Presently in use are steam tables in which there is a quantity of water kept at a relatively high temperature and in which the bottoms of food vessels are immersed to enable the vessels to contain food kept at a relatively warm temperature. Generally, hoods extend over the tops of the steam tables to enclose the same and to retain the heat. Due to the relatively low temperature of the water, vapor forms on the insides of the hoods and drips down on the food causing a condensation problem keeping the food moist and often in an unpalatable condition.

An object of the present invention is to provide a steam cabinet in which steam at high temperature may be introduced to instantaneously raise the temperature of food products kept therein.

Another object of the present invention is to provide a steam cabinet which has a steam generating means easily and readily cleaned of scale and corrosion due to the evaporation of water therein to generate the steam.

A still further object of the present invention is to provide a steam cabinet which is neat and attractive in appearance, one which may be employed in a restaurant in full view of the patrons of the restaurant, one which is fool-proof in operation, one which may be used to store a considerable number of food articles against a rush hour period of service at the restaurant and to instantly heat such articles to serving temperature, and one which is economical to manufacture and maintain.

Figure 1:
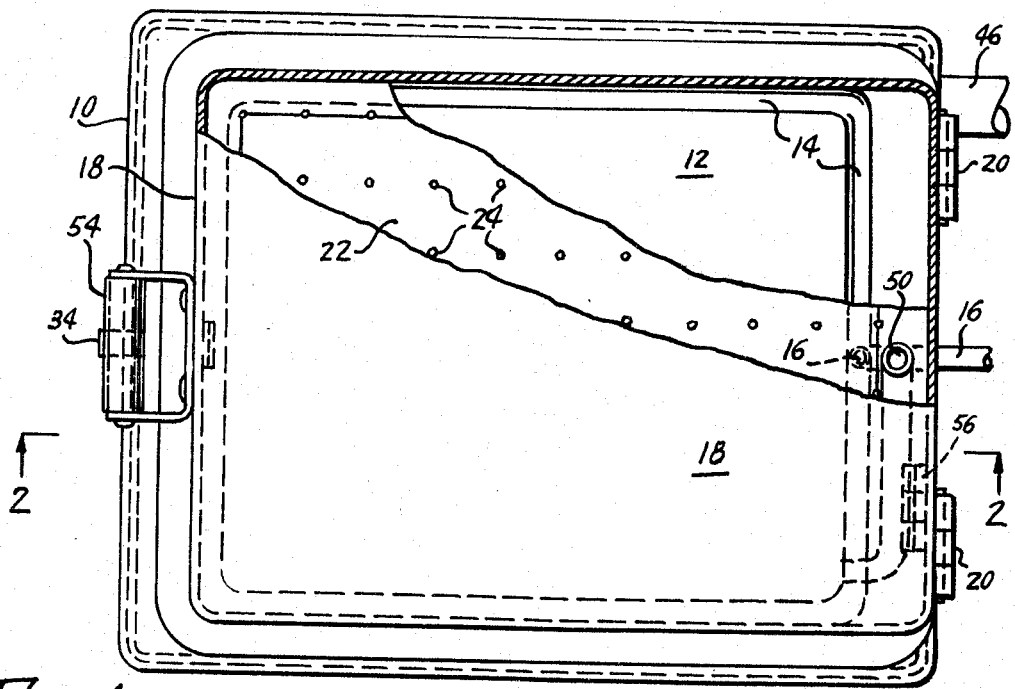
Figure 2:
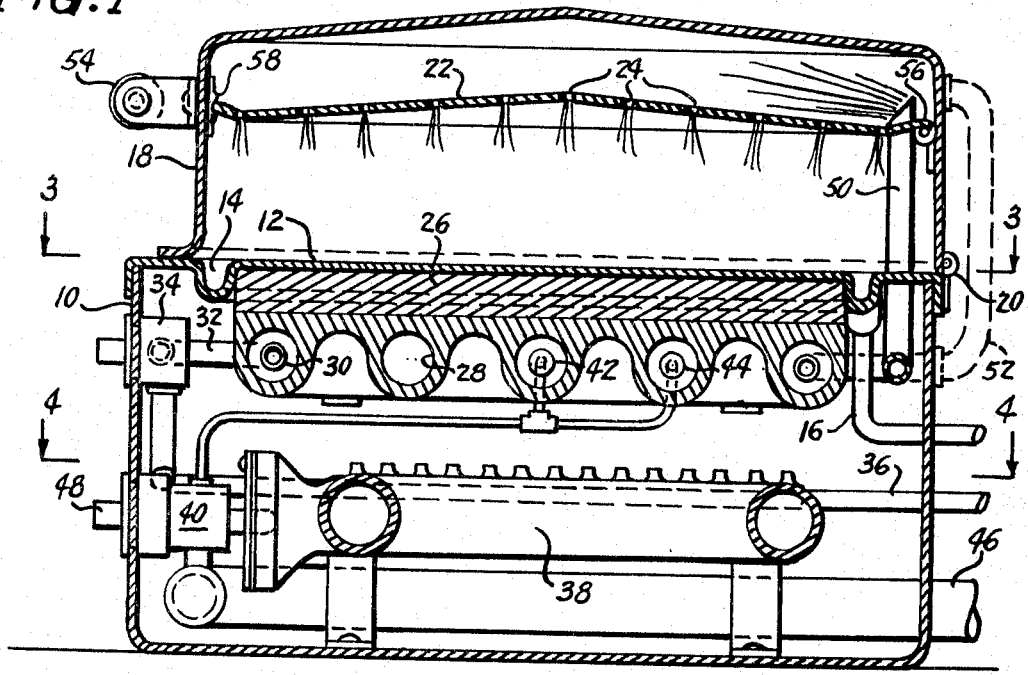
Figure 3:
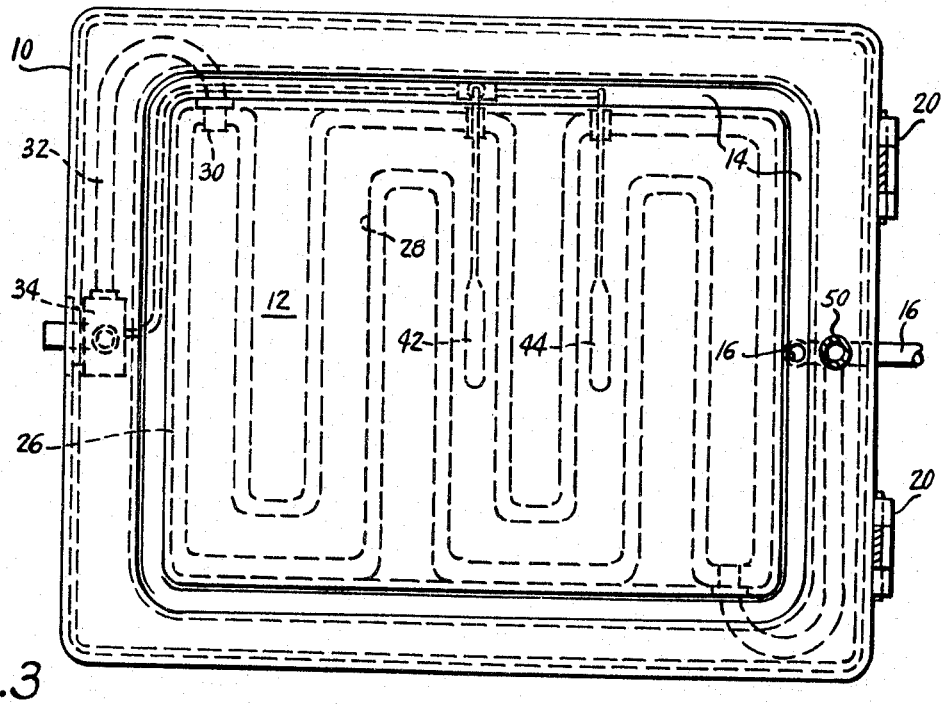
Figure 4:
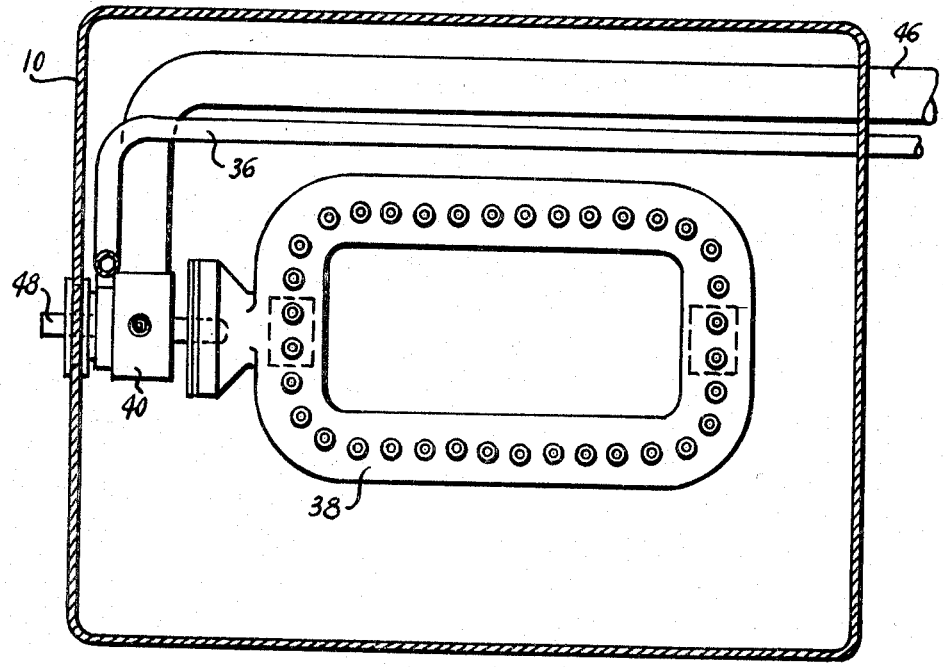

These and other objects and advantages of the invention will be apparent from the following description when taken in connection with the annexed drawings, in which:

FIGURE 1 is a top plan view of the first embodiment of the present invention with portions broken away to show the interior, FIGURE 2 is a view taken on the line 2—2 of FIGURE 1, FIGURE 3 is a view taken on the line 3—3 of FIGURE 2, FIGURE 4 is a view taken on the line 4—4 of FIGURE 2, FIGURE 5 is a view similar to FIGURE 2 showing a modified form of the invention, FIGURE 6 is a view in section showing a preferred form of the steam generating chamber for use with any of the embodiments of the present invention, FIGURE 7 is a top plan view of the further modification showing steam transferring hinges, and FIGURE 8 is a view, schematic in form, showing the control means for the steam generating means.

Referring in detail to the drawings in which like numerals indicate like parts throughout the several views and in particular to FIGURES 1 to 4, inclusive, the invention consists in a housing 10 having a tray 12 mounted on the upper end of the housing 10 as shown in FIGURE 2.

Formed integrally with the tray 12 is a trough 14 which is connected by a conduit 16 to a place of disposal for the condensation water.

Extending over the tray 12 is a hood 18 connected by a hinge 20 to the tray 12 at one end of the tray 12.

Extending across the upper end of the hood 18 and removably connected thereto is a partition 22 having perforations 24 therethrough. Directly beneath the tray 12 and within the area bounded by the trough 14 is a casting 26 having a tunnel or labyrinth passage 28 therethrough from one end to the other end for the production of steam. Means is provided on one end of the casting 26 for the admission of water through a nozzle 30, this means including a conduit 32 and a valve 34 connected by a pipe 36 to a source of supply.

Means is also provided for heating the casting 26 so as to convert the water from nozzle 30 to steam and a convenient method of doing this is providing a burner 38 having a control valve assembly 40 and thermostat sensing devices 42 and 44 installed in the labyrinth 28.

The thermostat device 42 governs the heat of the casting 26 and the device 44 is an over-riding thermostatic device for shutting off the flow of gas to the burner 38 in case the thermostatic device 42 fails for any reason.

A pipe 46 supplies gas to the control 40 which is turned off and on by the manual control 48 exteriorly of the housing 10.

An outlet for steam is provided in the casting 26 and it is connected by a conduit 50 to the space between the partition 22 and the upper portion of the hood 18.

An alternative connection is indicated in dotted lines in FIGURE 2 and it may be a flexible conduit 52 connecting the steam outlet and the casting 26 with the space between the partition 22 and the adjacent portion of the hood 18.

A handle 54 on the outside of the hood 18 provides a ready means by which the hood 18 may be lifted from the tray for the insertion of food onto the tray and the removal of the food from the tray.

As shown in FIGURE 2 the partition 22 is secured at one end by hinge 56 and at the other end by a detent means 58 which holds the partition 22 securely but permits its partial disengagement from the hood 18 so that the steam residue may be cleaned from the space between the partition 22 and the adjacent portion of the hood 18.

Similarly, as shown in FIGURE 6, it is intended that the casting 26 be provided with clean-out openings and plugs 55 so that a tool may be inserted into the casting to remove deposits normally associated with the production of steam.

With reference to the embodiment of the invention shown in FIGURE 5, the housing 10' is provided with a burner 38 supplied with gas from a pipe 46 and controlled by the control 40 as previously described. The casting 26' is provided at one end with clean-out plugs 55 and as shown in FIGURE 6 there are two inlets for water, as at 59 and 60. In FIGURE 5 a housing 62 is contained wholly within the space between the tray 12' and the hood 18', which is hinged at 56', is connected by conduits 64 and 66, an elbow 68, and a coupling 70 to the outlet of the casting 26'. The housing 62 is provided on its lower face with a plurality of openings or perforations 72 to permit the admission of steam into the space between the tray 12' and the hood 18'.

In FIGURE 7 a modified form of the housing 10 is indicated at 10'' and having a hood 18'' connected by a hollow hinge arrangement 74 for the passage of steam from the casting where it is generated to the space within the hood 18''. Such hollow hinge arrangements are conventional and no invention is claimed for the same.

With reference to FIGURE 8 it will be seen that in a preferred form of the invention the gas to the burner 38 is preferably electrically controlled with a master switch 76 and two thermostat switches as at 78 and 80 controlled by the thermostat devices 42 and 44. An electric valve 82 controls the flow of gas from the safety valve 84 including the pilot light attachment 86.

In any form of the invention it is an important feature that dry steam be admitted to the space beneath the hood where the food is normally placed on the tray. In order that dry steam be produced it is essential that sufficient heat be provided to heat the casting or chamber in which the steam is formed and to have the water inlet nozzle or inlet means at a sufficient distance from the outlet so as to completely convert all the water to dry steam. This prevents condensation of the steam to a greater extent than formerly provided in steam tables and keeps the food product articles from becoming soggy if stored upon the tray 12 for any length of time.

It is also essential that the chamber where the steam is produced being easily and readily cleaned with ordinary cleaning equipment so that scale formed from the evaporation of the water may not hinder the efficiency of the device in the production of steam.

The use of more than one inlet for water or nozzle also makes it certain that the plugging of one nozzle will not impair the usefulness of the device between cleaning periods.

It will be seen therefore that the apparatus according to the present invention enables the restaurant operator to produce hot foods in a very short interval of time using pre-cooked foods and using the tray to store the food between rush periods.

The variety of food articles which may be served from the apparatus of the present invention is infinite in variety and scope and the usefulness of the apparatus will be apparent to those skilled in the art.

While only preferred embodiments of the present invention have been shown and described, other embodiments are contemplated and numerous changes and modifications may be made in the invention without departing from the spirit thereof as set forth in the appended claims.

What is claimed is:

1. An apparatus for heating food product articles with steam comprising a tray for supporting food product articles to be heated, a removable hood extending over said tray enclosing said articles when on said tray, steam distributing means within said hood, a steam generating chamber beneath said tray, said steam generating chamber including a labyrinth tunnel having first and second parallel passages communicating in said tunnel at one end, two nozzles for admission of water independently into said first and second parallel passages and an outlet for steam, a conduit connecting said outlet to said steam distributing means, means connecting said nozzles to a source of water, and means for heating said chamber to vaporize said water when admitted to said chamber through said nozzles.

2. An apparatus for heating food product articles with steam comprising a tray for supporting food product articles to be heated, said tray having a flat central portion and a surrounding peripheral trough, a disposal conduit connected in communication with the trough for carrying away liquids, a removable hood extending over said tray enclosing said articles when on said tray, a perforated partition pivotally secured at one edge to one side of the hood and frictionally secured at the opposite edge to the opposite side of the hood to form a steam distributing chamber confined on top and around the sides by the hood and on the bottom by the perforated partition, a steam generating chamber beneath said tray, said steam generating chamber including a labyrinth tunnel having at least two nozzles for admission of water thereinto and an outlet for steam, a flexible conduit connecting said outlet to said steam distributing means, means connecting said nozzles to a source of water, and means for heating said chamber to vaporize said water when admitted to the chamber through said nozzles.

3. An apparatus for heating food, comprising:
a tray for supporting the food;
a steam generating chamber secured below the tray for heating the tray and generating superheated steam, said chamber comprising,
    an integrally formed body having a labyrinth tunnel therein, said tunnel having two independent inlet openings and a steam outlet opening,
    two nozzles respectively in the independent inlet openings,
    two conduits connected to the nozzles for supplying water thereto;
means for heating the steam generating chamber;
means for controlling the temperature of the steam generating chamber comprising,
    a controller for the heating means, and
    first and second temperature sensors disposed in successive labyrinth passages, said first sensor being connected to said controller for maintaining the steam generating chamber at a desired temperature and said second sensor being connected to said controller for turning said heating means off upon failure of said first sensor and controller properly to maintain the desired temperature;
a removable hood extending over the tray to enclose the food thereon;
steam distribution means in the hood; and
means interconnecting the steam generating chamber and the steam distributing means for conducting steam to said steam distributing means.

4. The apparatus of claim 3 wherein:
the steam distributing means comprises a perforated partition secured at its edges adjacent the sides of the hood to form a distribution chamber bounded on the top and sides by the hood and on the bottom by the perforated partition.

5. The apparatus of claim 4 wherein:
the perforated partition is pivotally secured at one side to the hood and frictionally engaged with the hood at the opposite side.

6. The apparatus of claim 3 wherein:
the interconnecting means comprises an upright conduit fixed at one end in communicating relation with the steam chamber and extending into the space enclosed by the hood; and
the steam distribution means comprises a housing having one enclosing side perforated for steam distribution, said chamber being fixedly supported by the interconnecting means.

References Cited by the Examiner

UNITED STATES PATENTS

| | | | |
|---|---|---|---|
| 1,226,849 | 5/1917 | Bookman | 122—208 |
| 1,989,581 | 1/1935 | Bechtel | 122—208 X |
| 2,181,434 | 11/1939 | Lewis et al. | 126—369 X |
| 2,719,211 | 9/1955 | Lewis et al. | 126—369 |
| 2,980,099 | 4/1961 | Klemm | 126—20 |
| 3,069,994 | 12/1962 | Lewis | 126—369 X |
| 3,203,414 | 8/1965 | Lassiter | 126—369 |

FREDERICK L. MATTESON, JR., *Primary Examiner.*

ROBERT A. DUA, *Examiner.*